J. H. WAGENHORST.
VEHICLE WHEEL RIM.
APPLICATION FILED DEC. 6, 1915.

1,201,122.

Patented Oct. 10, 1916.

James H. Wagenhorst, Inventor
By his Attorney
Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,201,122.      Specification of Letters Patent.      Patented Oct. 10, 1916.

Original application filed May 20, 1911, Serial No. 628,386. Divided and this application filed December 6, 1915. Serial No. 65,206.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

My invention relates generally to vehicle wheel rims of the type designed to carry pneumatic or other resilient tires, and particularly to a device for securing a demountable rim in place on a wheel, comprising the wedging latch and associated parts shown and described in my application Serial Number 589,680, filed October 29, 1910, upon which Patent Number 1,103,637 was granted me on July 14, 1914, and in my co-pending application Serial Number 628,386, filed May 20, 1911, patented March 28, 1916, No. 1,177,457 of which the present application is a division.

The description of the parts shown in my companion cases not relevant to the invention claimed herein will be omitted from this divisional case, but it is to be understood that the utility of the wedging latch herein claimed is not limited to the particular type of rim chosen for purpose of illustration, nor is the form of the wedge portion of such latch illustrated as the preferred embodiment of my invention for the rim shown intended as a limitation, since my improvement is adaptable by change of form to be used with any type of demountable rim adapted to be locked upon a fixed rim by lateral wedges engaging therebetween.

Figure 1:
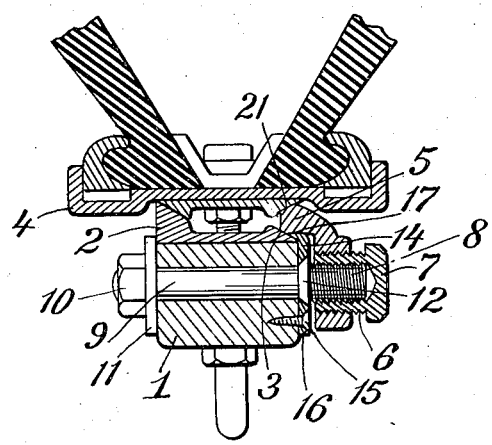
Figure 2:
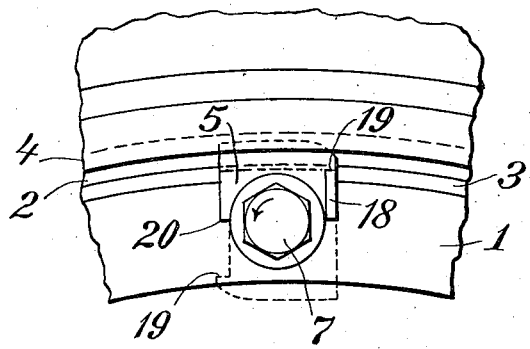
Figure 3:
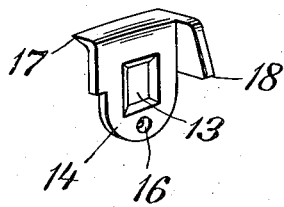
Figure 4:
Figure 5:
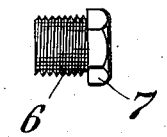

In the accompanying drawings which form a part of this specification, Figure 1 is a sectional view of a vehicle wheel felly, a fixed rim thereon, and a demountable rim seated on said fixed rim, and locking means including a rotatable wedging latch carried by said felly; Fig. 2 is a side elevation of a part of the rim, felly, and locking means, the wedging latch being shown in operative position partly in full and partly in dotted lines, and in inoperative position in dotted lines; Fig. 3 is a perspective view of the washer forming a part of said locking means; Fig. 4 is a detail side elevation of the bolt forming a part of the said locking means, and Fig. 5 is a like view of a headed sleeve forming part of said locking means.

Referring to the drawings in detail, the felly 1 of the wheel is provided with a fixed rim 2 permanently secured thereto by shrinking or in any other suitable manner. This fixed rim is provided at one edge with a raised flange having an inclined bearing surface, and at the other edge with a similarly inclined bearing surface 3. The demountable tire-carrying rim 4 is provided with a pair of oppositely inclined internal bearing surfaces, one of which engages one of the inclined bearing surfaces upon the fixed rim, while the other bearing surface is engaged and supported by the inclined surfaces of a wedging latch 5. Any suitable number of these wedging latches may be employed. Each of these wedging latches 5 has an internally threaded opening through the body portion thereof and screws upon an externally and internally threaded nut or sleeve 6. Each sleeve 6 is provided with a head 7 of suitable form for engagement by a wrench or other means for rotating the same and screws upon the projecting threaded end 8 of a bolt 9 passing transversely through the felly. These bolts are secured to the felly by means of nuts 10 and washers 11, or in any other suitable manner. Each bolt is preferably provided with the beveled collar 12 of square or other angular shape adapted to engage the walls of a correspondingly shaped opening 13 in the washer 14. The bolt thus secures the washer to the face of the felly, while the washer 14 is itself held from rotation upon the felly and prevents the rotation of the bolt 9, as by means of screws 15 passing through holes 16 therein. The washers are also provided at their outer or upper edges with inwardly turned flanges 17 adapted to fit over the beveled surface 3 of the fixed rim or felly band 2, which engagement thus further prevents the rotation of the washers. The outer surfaces of the flanges 17 preferably lie in the surface of a cylinder concentric with the axis of rotation of the wheel and serve to support the wedge portions of the members 5 and to guide the same into operative position between the fixed and demountable rims. Each washer 14 is also provided with a projecting flange 18 adapted to be engaged by a shoulder 19 formed upon each wedging latch when it is rotated to operative position, as shown in operative position in full lines excepting its upper edge, shown in dotted lines, seated behind the flange of the demountable rim 4. The lug or flange 18 is engaged by a second shoulder 20, also formed on each wedge member, when the latter is operated to inoperative position, as shown in dotted lines in Fig. 2.

The operation of this locking device is as follows: Supposing the rim to be locked upon the wheel, the parts of the locking device being in position as shown in Fig. 1, the nut or sleeve 6 will be rotated in such a direction as to screw along the bolt portion 8 in a direction away from the felly. The external thread upon the nut or sleeve 6 is given a pitch, as shown in Fig. 5, opposite to that of the bolt portion 8, as shown in Figs. 1 and 4, so that this rotation of the nut or sleeve 6 will cause the wedging latch to move along the sleeve 6 and in the direction of the head 7 thereof. The wedging latch 5 will thus have a combined movement equal to the sum of the pitch distance of the two threads for each revolution of the sleeve or nut. When the wedge member has been drawn out sufficiently so that its end clears the washer 14, it will rotate with the nut or sleeve 6 in the direction indicated by the arrow in Fig. 2 into the position shown in dotted lines in that figure, where it will be stopped by the engagement of its shoulder 20 with the under-side of the lug 18. When each of the wedges has been moved to this position the rim is free to be removed from the wheel. To return the wedge member to operative position, it is simply necessary to rotate the nut or sleeve 6 in the opposite direction, which will first carry the wedging latch back to upright position, where it will be stopped by the engagement of the shoulder 19 with the upper edge of the lug 18. Further rotation of the nut or sleeve 6 will cause the wedge member of the latch to move inward, guided first by the engagement of the shoulder 19 with the lug 18, and then by the engagement of the under-surface of the wedge member with the outer surface of the flange 17 on the washer 14. The wedging surfaces of the wedge member 5 will finally engage with the surface 21 on the demountable rim, the wedge member being supported by the outer surface of the flange 17 and by the beveled surface 3 on the fixed rim.

Having thus described my invention, I claim:

1. In a vehicle wheel, in combination, a felly, a tire-carrying rim supported at one side by said felly, wedges for supporting the other side of said rim, and unitary means carrying said wedges acting by the rotation thereof to first move said wedges into an operative position, and then force the same laterally into engagement with said rim.

2. In a vehicle wheel, in combination, a felly, a tire-carrying rim supported at one side by said felly, a member carried by the felly and rotatable about an axis transverse to the plane of rotation of the wheel, and a wedge for supporting the other side of said rim rotatably mounted on said member, the rotation of said member in one direction acting first to rotate said wedge into a position to permit the wedging portion thereof to enter the space between the felly and rim, and then to force said wedge laterally into wedging engagement with said rim.

3. In a vehicle wheel, in combination, a felly, a tire-carrying rim supported at one side by said felly, a member carried by the felly and rotatable about an axis transverse to the plane of rotation of the wheel, a portion of said member being externally threaded, and a wedge for supporting the other side of said rim screwing on the externally threaded portion of said member, the rotation of said member in one direction acting first to rotate said wedge into a position to permit the wedging portion thereof to enter the space between the felly and rim, and then to force said wedge laterally into wedging engagement with said rim.

4. In a vehicle wheel, in combination, a felly, a tire-carrying rim supported at one side by said felly, a member having a screw-threaded engagement with means carried by said felly and rotatable about an axis transverse to the plane of rotation of said wheel, said member being externally threaded, a wedge for supporting the other side of said rim screwing on the externally threaded portion of said member, and rotatable through a portion of a revolution, and means for limiting the rotary movement of said wedge in each direction.

5. In a vehicle wheel, in combination, a felly, a tire-carrying rim supported at one side by said felly, a bolt passing transversely through said felly and having a screw-threaded portion projecting from the side of the latter, a sleeve screwing on said projecting portion of said bolt, said sleeve being provided with an external screw-thread of a pitch opposite to that of the bolt portion, a wedge for supporting the opposite side of said rim screwing on said sleeve, said wedge being free to rotate through a part of a revolution when the sleeve is rotated to draw the wedge away from the felly, and means for limiting the rotary movement of said wedge.

6. A wedging latch for securing a demountable rim upon a fixed rim comprising a bolt, a sleeve riding thereon, and a wedge riding upon said sleeve, said sleeve engaging both said bolt and said wedge in screw-threaded engagement, said wedge being rotatable upon said sleeve when the latter is in its outward position upon said bolt.

7. A rotatable wedge for promoting the wedging engagement of a demountable rim with a fixed rim, and comprising a wedge portion adapted to screw upon the exterior of a sleeve formed to screw upon a bolt, the exterior and interior threads of said sleeve being of opposite pitch, and means to limit the rotation of said wedge in either direction.

JAMES H. WAGENHORST.